United States Patent
Kamariotis et al.

(10) Patent No.: US 8,311,094 B2
(45) Date of Patent: Nov. 13, 2012

(54) BUFFER UNDERFLOW PREVENTION

(75) Inventors: Othon Kamariotis, Athens (GR); Rory Stewart Turnbull, Ipswich (GB); Roberto Alvarez Arevalo, Ipswich (GB)

(73) Assignee: British Telecommunications PLC, London (GB)

( * ) Notice: Subject to any disclaimer, the term of this patent is extended or adjusted under 35 U.S.C. 154(b) by 1323 days.

(21) Appl. No.: 11/792,854

(22) PCT Filed: Dec. 8, 2005

(86) PCT No.: PCT/GB2005/004717
§ 371 (c)(1),
(2), (4) Date: Jun. 12, 2007

(87) PCT Pub. No.: WO2006/067374
PCT Pub. Date: Jun. 29, 2006

(65) Prior Publication Data
US 2008/0130737 A1    Jun. 5, 2008

(30) Foreign Application Priority Data
Dec. 22, 2004   (GB) .................................. 0428155.6

(51) Int. Cl.
*H04N 7/12*  (2006.01)
(52) U.S. Cl. .......... 375/240.02; 375/240.01; 375/240.22
(58) Field of Classification Search .............. 375/240.01, 375/240.28, 240.2–6, 240.22–25
See application file for complete search history.

(56) References Cited

U.S. PATENT DOCUMENTS

| | | | |
|---|---|---|---|
| 5,079,630 A | | 1/1992 | Golin et al. |
| 5,572,654 A | | 11/1996 | Coelho |
| 5,594,660 A | * | 1/1997 | Sung et al. .................... 715/203 |
| 5,619,341 A | | 4/1997 | Auyeung et al. |
| 5,754,241 A | * | 5/1998 | Okada et al. ............. 375/240.05 |
| 5,764,293 A | * | 6/1998 | Uz et al. ..................... 348/390.1 |
| 5,844,867 A | | 12/1998 | De Haan et al. |
| 5,847,766 A | | 12/1998 | Peak |

(Continued)

FOREIGN PATENT DOCUMENTS

CN    1146265    3/1997

(Continued)

OTHER PUBLICATIONS

Uttam K. Sarkar, Subramanian Ramakrishnan, Dilip Sarkar; Modeling Full-Length Video Using Markov-Modulated Gamma-Based Framework; Aug. 2003; IEEE/ACM; vol. 11; pp. 1-12.*

(Continued)

*Primary Examiner* — Christopher Brown
*Assistant Examiner* — Fahimeh Mohammadi
(74) *Attorney, Agent, or Firm* — Nixon & Vanderhye PC

(57) ABSTRACT

A video stream is digitally encoded such that the rate at which individual segments of data are encoded varies according to the amount of data required to generate each segment. Frames are selectively omitted from transmission (32) such that the cumulative frame rate does not fall below a predetermined value. This process can be used to ensure that the next frame to be displayed is always available in the buffer store 6 associated with the decoder (2). The decoder (2) is arranged to identify where frames have been omitted from the decoded transmission, and to perform a resynchronisation (7) on the decoded stream by comparison between time stamps in the video stream and a corresponding audio stream. Resynchronisation may be performed by extending the durations of individual frames, or by repeating frames.

7 Claims, 11 Drawing Sheets

U.S. PATENT DOCUMENTS

| | | | |
|---|---|---|---|
| 6,037,985 A | 3/2000 | Wong | |
| 6,167,084 A * | 12/2000 | Wang et al. | 375/240.02 |
| 6,167,085 A | 12/2000 | Saunders et al. | |
| 6,683,911 B1 * | 1/2004 | Inoue | 375/240.26 |
| 7,010,173 B2 * | 3/2006 | Haskell et al. | 382/268 |
| 7,450,646 B2 * | 11/2008 | Kurauchi | 375/240.26 |
| 2002/0150126 A1 * | 10/2002 | Kovacevic | 370/503 |
| 2003/0067981 A1 | 4/2003 | Zhao et al. | |
| 2003/0142689 A1 * | 7/2003 | Haberman et al. | 370/429 |
| 2003/0202580 A1 | 10/2003 | Noh et al. | |
| 2003/0202706 A1 | 10/2003 | Uchibayashi et al. | |
| 2003/0223494 A1 * | 12/2003 | Kurauchi | 375/240.08 |
| 2004/0194143 A1 * | 9/2004 | Hirose | 725/97 |
| 2005/0074063 A1 * | 4/2005 | Nair et al. | 375/240.11 |
| 2005/0094725 A1 * | 5/2005 | Hui | 375/240.02 |
| 2008/0137735 A1 | 6/2008 | Kamariotis et al. | |
| 2009/0290635 A1 * | 11/2009 | Kim et al. | 375/240.02 |

FOREIGN PATENT DOCUMENTS

| | | |
|---|---|---|
| CN | 1453936 | 11/2003 |
| EP | 0 736 843 A2 | 10/1996 |
| EP | 0 742 674 A2 | 11/1996 |
| EP | 0 892 561 A2 | 1/1999 |
| EP | 1 251 701 A2 | 10/2002 |
| EP | 1 487 217 A2 | 12/2004 |
| JP | 8-265747 | 10/1996 |
| JP | 2003-189308 | 7/2003 |
| WO | WO 99/49664 | 9/1999 |

OTHER PUBLICATIONS

PCT International Search Report mailed Feb. 28, 2006 in International Application No. PCT/GB2005/004718.

PCT International Search Report mailed Feb. 28, 2006 in International Application No. PCT/GB2005/004717.

UK Search Report dated Apr. 26, 2005 in Application No. GB 0428160.6.

UK Search Report dated Apr. 28, 2005 in Application No. GB 0428158.0.

UK Search Report dated Apr. 22, 2005 in Application No. GB 0428155.6.

UK Search Report dated Apr. 22, 2005 in Application No. GB 0428156.4.

Kawahara et al., "A Single Chip MPEG1 Decoder," International Conference on Consumer Electronics—Digest of Technical Papers, Jun. 7-9, 1995, Vol. Conf. 14, pp. 254-255, XP000547810.

Ding, "Joint Encoder and Channel Rate Control of VBR Video Over ATM Networks," IEEE Transactions on Circuits and Systems for Video Technology, vol. 7, No. 2, Apr. 1997, pp. 266-278.

Willebeek-LeMair, "Videoconferencing Over Packet-Based Networks," Communications, vol. 15, No. 6, Aug. 1997, pp. 1101-1114.

Vetro, "MPEG-4 Rate Control for Multiple Video Objects," IEEE Transactions on Circuits and Systems for Video Technology, vol. 9, No. 1, Feb. 1999, pp. 186-199.

English translation of Chinese Office Action dated Mar. 6, 2009 in CN 2005800440439.

English translation of Chinese Office Action dated Aug. 14, 2009 in CN 2005800440439.

Office Action/Communication pursuant to Article 94(3) in EP 05 813 934.6-2223 dated Jan. 5, 2009.

Office Action/Summons to attend oral proceedings pursuant to Rule 115(1) EPC in EP 05 813 934.6-2223 dated Oct. 2, 2009.

* cited by examiner

BUFFER UNDERFLOW PREVENTION

This application is the U.S. national phase of international application PCT/GB2005/004717 filed 8 Dec. 2005 which designated the U.S. and claims benefit of GB 0428155.6, dated 22 Dec. 2004, the entire content of which is hereby incorporated by reference.

This invention relates to digital video compression, and in particular buffer underflow prevention.

Video streaming is available over mobile IP networks (3G, GPRS, Wimax, WLAN etc), fixed networks (like DSL, Cable, PSTN etc) and digital television services, and new products are being developed such as DVD-Recorders, Personal Video Players (PVP) for digital video storage, and digital video cameras. All these services and products are competing for the best video quality and best-fixed storage space management.

Video compression technology has become a key technology in digital video communications. Several international standards have been established in video compression, such as MPEG-2, MPEG-4, H263, and the latest standard, H264. One common feature of these standards is that they only provide the syntax of the compressed video stream. The output bit stream can use either a constant-bit-rate encoding process (CBR) or a variable-bit-rate process (VBR). Since many digital video applications are constrained to a constant channel bandwidth or a fixed storage (buffer) size, CBR encoding has been widely adopted because of its practical implementation. However, CBR encoding suffers from some drawbacks.

Firstly, it results in inconsistent visual quality. The amount of compression required can vary significantly between one frame and another, or even between macro-blocks within the same frame. As a result, the decoded video sequence exhibits inconsistent visual quality. Secondly, it can result in low coding efficiency. The bit rate selected has to be sufficient to provide an acceptable picture quality for all parts of the transmission. However, this bit rate is necessarily higher than is required for most of the transmission.

A real video sequence usually consists of many scenes, and each of them may represent very different activity and motion features. Consequently it is desirable that more bits should be allocated to those scenes of high activity whilst fewer bits are required for those of low activity. This is the basis of variable bit rate coding (VBR). Compared with CBR encoding, VBR can provide less delay, consistent visual quality, and higher coding efficiency for many video sequences. However, VBR encoding has very serious bit-rate and buffer-size constraints, in particular because an unconstrained VBR encoder may not meet the bandwidth limitations of the medium over which the signal is to be transmitted because the transient bit-rate may fluctuate significantly. In addition, VBR is difficult to operate over a multi-streaming link because individual parts of the stream cannot be allocated consistently to each stream, as for example in a simple time division multiplex.

Most standard compression processes operate on each block of 8×8 pixels in a frame, (or a group of several adjacent blocks, known as a "macroblock"). The block in the previous frame is identified that most closely resembles the block under consideration (usually the one in the same position or an adjacent one) and the difference between the luminance and chrominance value of each pixel of the block under consideration and the corresponding pixel in the selected preceding block. The resulting data is subjected to a discrete cosine transform, and the resulting values then divided by a quantisation factor Q before transmission. The quantisation factor reduces the individual values such that the data can be transmitted within the available bit rate. A large value of Q allows a greater range of values (more differences between one block and the one it is compared with), but results in loss of fine detail, as small differences in actual values result in the same quantisation level. The value of Q is thus an inverse measure of picture quality. In a VBR system the value of Q is constant for the entire transmission, whereas in a CBR system it can vary between frames.

The invention of the applicant's co-pending International application entitled "Processing Video Signals", which has the same filing date as the present application and claims priority from United Kingdom application GB 0428160.6, provides a video signal compression process, in which a video sequence is divided into multi-frame segments, the number of bits required to code each video segment in uncompressed form is determined, and a quantisation level is selected for the transmission of each segment such that the overall bit rate of the segment falls within predetermined limits. That invention also provides an encoder suitable to perform the process of the invention. By applying the same quantisation level to a segment of several frames, distracting changes in quantisation level and thus picture quality are reduced. This invention also allows a reduced signalling overhead because the changes in quantisation level are less frequent, and the reduced variability makes buffer control management easier. The segments are defined such that in each segment the number of bits required to code each frame in uncompressed form falls within a range having a predetermined magnitude, and a quantisation level is determined for each segment. This results in segments of variable length, with fewer transitions when the appropriate coding rate is not varying, but the ability to respond to more rapid changes when required.

To further minimise distracting changes in quantisation level, a preferred embodiment of the invention in the co-pending application arranges that if, in three consecutive segments, the first and third segments both have the same quantisation level selected, that level is also applied to the intermediate segment. Furthermore, in the preferred embodiment, large changes in quantisation level between one segment and the next are smoothed. This can be achieved by incrementally adjusting the quantisation level stepwise over a plurality of frames at the boundary between the segments. Preferably the stepwise adjustment in the quantisation level is such that the bit rate in frames of the segment having the higher bit rate is reduced.

The process of determining the quantisation level required to code each segment may be performed by encoding each frame of the sequence with each of a plurality of quantisation values and determining therefrom the quantisation value that most closely satisfies the required bit rate. A suitable mathematical process for deriving this value will be described later in this specification.

In the process disclosed in the co-pending application GB 0428160.6 referred to above, a first pass of the video sequence is used to generate an optimum bit rate for video streaming or fixed storage applications by selecting appropriate quantisation parameters for each segment, and then the complete sequence is transmitted on a second pass. The need for two passes delays the transmission by the time taken to perform the additional pass. However, for some applications it may be possible to determine the appropriate parameters in advance for a number of selected values of bit rate, such that a request for transmission at a given bit rate can be fulfilled more promptly.

Like all digital encoding schemes, this arrangement relies on an adequate buffer store being available at the receiving end of the transmission, because the number of bits per frame varies, and it is necessary to store all the data necessary for the recreation of a frame before it can be generated. Buffer "underflow", or starvation, can occur if the number of bits per frame is large (and the transmitted frame rate thus falls), such that the decoder does not have sufficient data to generate the next frame at the time it is to be displayed. Buffer overflow occurs when the buffer store is insufficient for the number of bits that have been received, and not yet used.

It is possible to provide the decoder with information generated by the encoder before the start of the video packets' transmission, to allow buffer resources to be reserved to prevent buffer underflow and buffer overflow conditions.

The present invention provides a process of transmitting a digitally encoded video stream in which the rate at which individual segments of data are encoded varies according to the amount of data required to generate each segment, wherein frames are selectively omitted from transmission such that the cumulative frame rate does not fall below a predetermined value. This ensures that the receiver does not experience an underflow condition.

A threshold limit may be set for the amount by which the number of bits per frame may vary within a given sequence, thereby limiting the number of frames that may be deleted. The invention also provides a variable bit rate data decoding process, arranged to identify parts of a decoded transmission from which frames have been omitted, and to resynchronise the displayed stream. Synchronisation may be controlled by comparison between time stamps in the video stream and a corresponding audio stream. Resynchronisation may be performed by extending the durations of individual frames, or by repeating frames.

The applicant's co-pending application entitled "Buffer Overflow Prevention" having the same filing date as the present application and claiming priority from United Kingdom application 0428156.4 provides a process of decoding a digitally encoded video input stream in which individual segments of data are encoded at rates that vary according to the amount of data required to regenerate each segment, wherein the cumulative average frame rate in the input is monitored and frames are selectively deleted from the received input in response to the monitored cumulative average such that the cumulative average frame rate in the decoded output does not fall below a predetermined value.

The invention also provides a variable bit rate data decoding process arranged to identify parts of a decoded transmission from which frames have been omitted, and to resynchronise the displayed stream.

Preferably a threshold limit may be set for the amount by which the number of bits per frame may vary within a given sequence, thus limiting the loss in perceptual quality occasioned by the reduced frame rate. If used in conjunction with the invention of the aforementioned co-pending application claiming priority from United Kingdom application GB 0428160.6, the threshold limit may be the predetermined magnitude within which the number of bits required to code each frame in uncompressed form is constrained to fall.

This mode does not require extra information to be transmitted prior to the 'Video Streaming session', and buffering is avoided at the beginning of the clip, so the start-up delay is significantly minimized. Each frame that is displayed will have the same video quality, but the video is displayed with a reduced frame rate, and in consequence the perceived video quality may be slightly impaired.

The setting of a threshold limit also allows a maximum value to be determined for the buffer store required for the receiver to decode the sequence.

An embodiment of the invention will now be described, by way of example, with reference to the drawings, in which.

Figure 1:
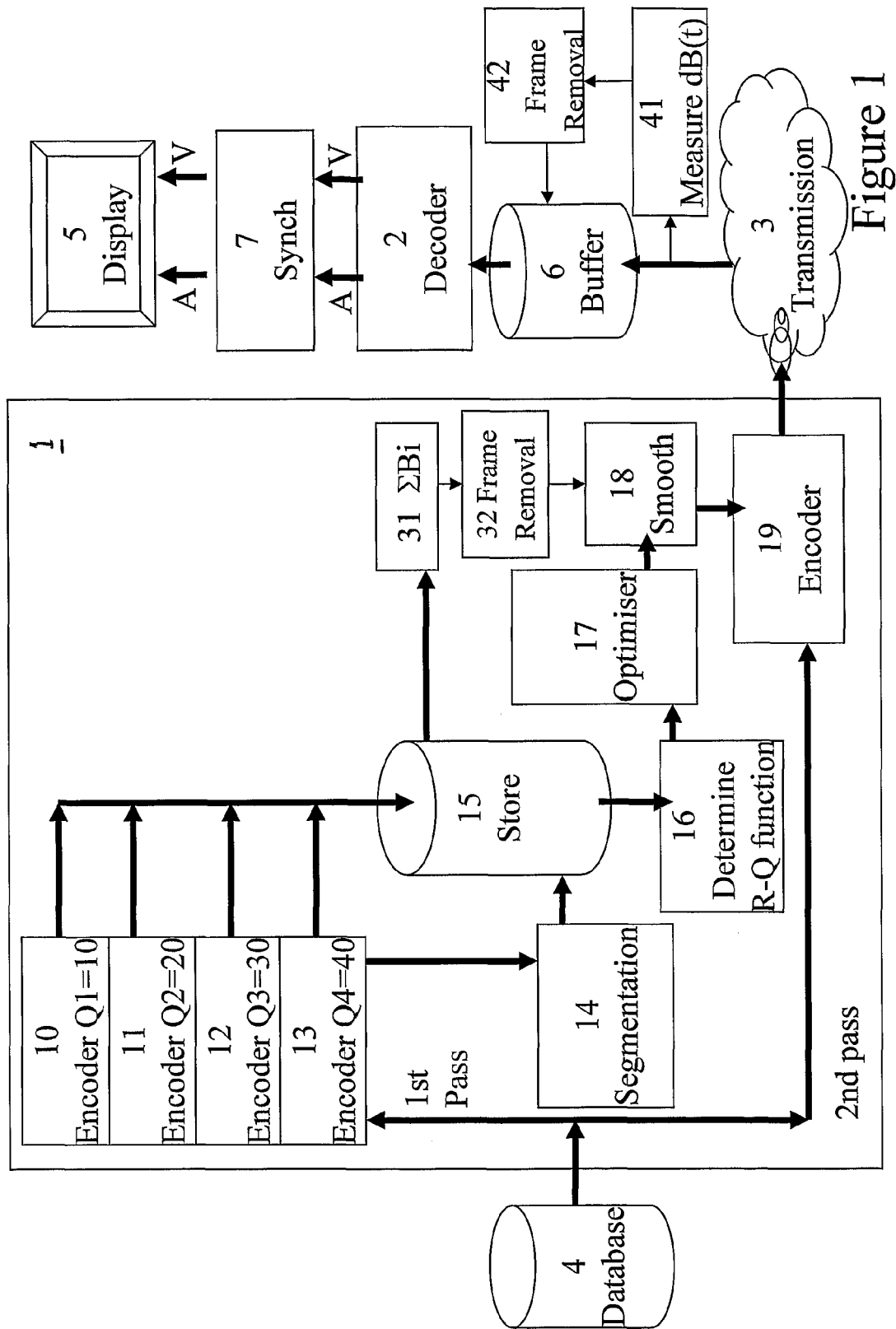
FIG. 1 is a schematic representation of the various components that co-operate to perform the invention

FIG. 1 represents the operations performed in carrying out the invention as a series of functional elements. It will be understood that these operations may be performed by a microprocessor, and that the physical components are not necessarily distinct. In particular, similar processes shown as operating in parallel or sequentially 10, 11, 12, 13, 19 may be performed in rotation by a single component.

A video encoder 1 and a decoder 2 are interconnected by a communications link 3. The video encoder 1 is associated with a database 4 from which it can retrieve data for encoding and transmission to the decoder 2, which is associated with a display device 5 such as a television set for displaying the decoded data. The decoder 2 has an associated buffer store 6.

The video encoder 1 comprises a number of functional elements. The encoder 1 processes the data retrieved from the database 4 using a 'two-pass' process. Firstly, the entire sequence is parsed (10, 11, 12, 13). From these results, the sequence is split (14) into a number of segments and statistics are stored (15) for those segments. Data from the encoding process is used to generate a general relationship between bit rate and quantisation level (16) and an optimum quantisation level is then identified 17 for each segment. This value is modified by a smoothing process 18. Using these statistics, a final bit-stream (or multiple bit-streams) with 'VBR' characteristics can be generated in a second pass 19. The statistics can also be used to prevent 'buffer-overflow' and 'underflow'.

Because this is a 'two-pass' process, a delay is introduced which makes the process primarily suitable for non-live video content (Video on demand). However, it will be understood that the processing time required for the first pass may be faster than the transmission rate, as it is not constrained by the bandwidth of the connection 3.

The individual processes will now be discussed in more detail.

Figure 3:
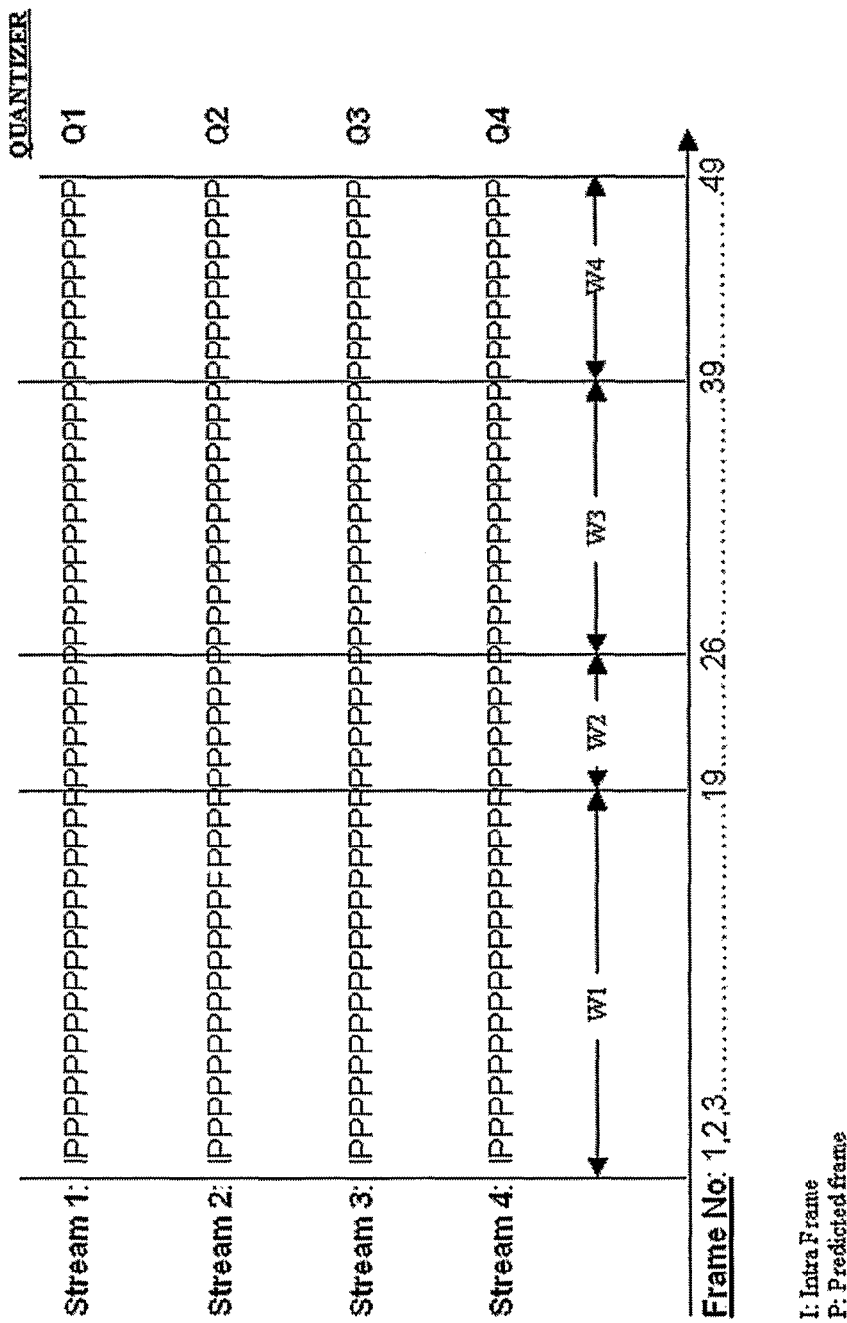
FIG. 3 illustrates an analysis step of the process

In the first pass, the video sequence is first analysed by a number of VBR encoders (10, 11, 12, 13) operating in parallel to encode the video sequence for various quantisation levels Q1, Q2, Q3, Q4. This step is performed frame-by-frame. This is illustrated in FIG. 3, which shows four streams, each one having its own quantizer. For example 'Frame 1' is first encoded with each quantisation level 'Q1', 'Q2', 'Q3' and 'Q4'. Then, 'Frame 2' is encoded with the same quantizer sequence, until the entire sequence is processed. The processing power needed for this step is four times a standard 'VBR' encoder. Empirical tests showed that suitable Quantizer values for an encoder operating to the H264 standard would be:

Q1=10, Q2=20, Q3=30, Q4=40. This allows an accurate R-Q function to be determined (process 16), relating the quantisation level Q to the number of bits per frame R. The corresponding computational expense is approximately four times that of a typical VBR encoder.

The R-Q function is applicable to multiple streams of variable bit rates so it is referred to below as the 'Multi-Stream Rate Control (MRC)' function. It may be determined (process 16) as follows. In this embodiment two mathematical models are used, as experimental results have shown that they are accurate over different ranges of Q.

$$R=a'e^{-b'Q} \quad \text{(MRC function 1)}$$

The second model is a third order polynomial:

$$R=aQ^3+bQ^2+cQ+d \quad \text{(MRC function 2)}$$

where R: average bits/frame
Q: quantization parameter
and: a', b', a, b, c, d are modelling parameters, which are to be determined. The first model is a good approximation over the range 21<Q<50, and the second over the range 0<Q<30.

Note here that as the number of bits per frame R falls with increasing values of Q, the quantisation parameter, and both properties can only take positive values, at least one of the coefficients a, b, c will be negative, and a' and b' must both be positive.

'Model 1' needs two modelling parameters a', b', and thus needs two streams to determine the values of those parameters, while 'Model 2' needs four modelling parameters, and therefore all four streams are needed to determine their values.

Figure 4:
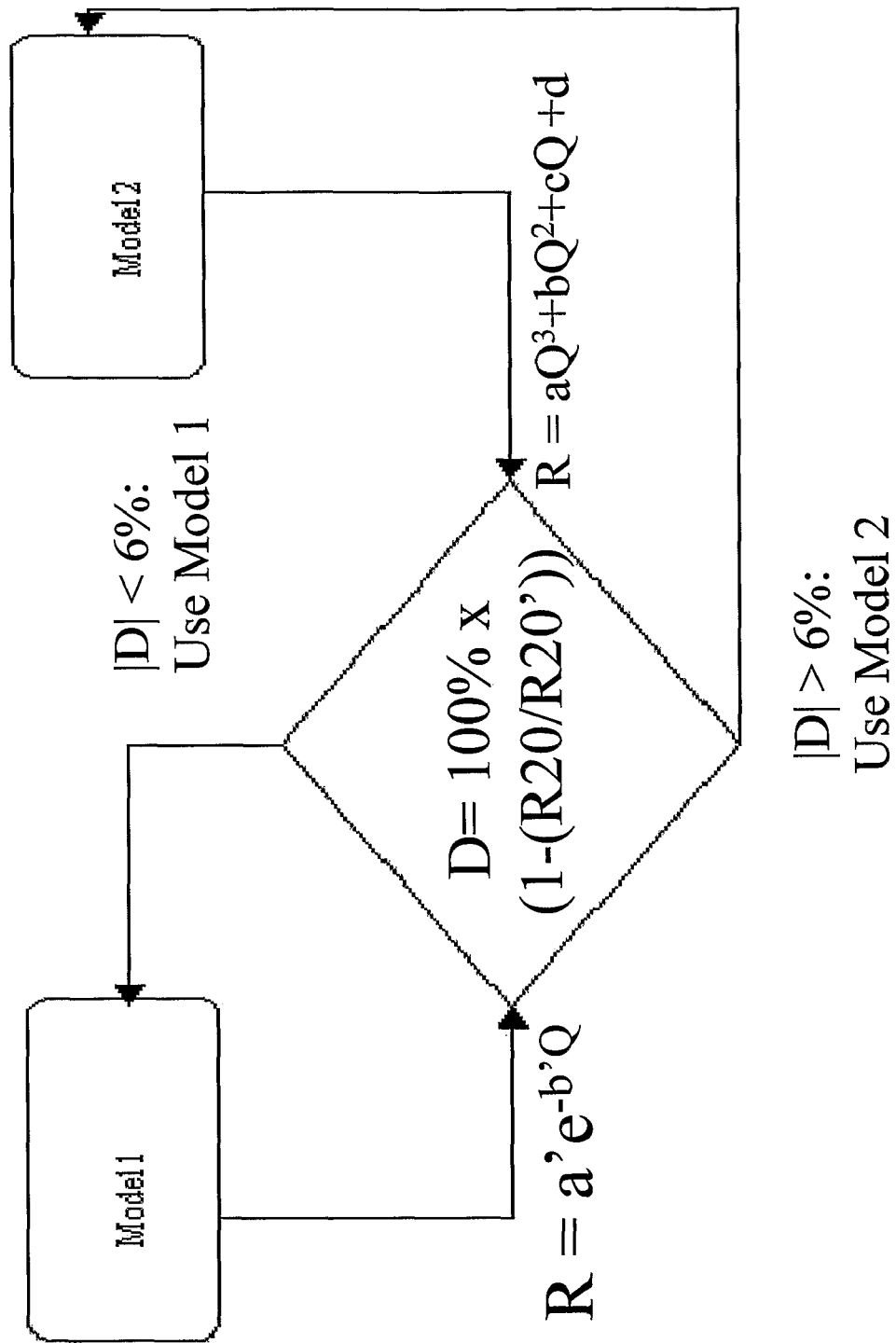
FIG. 4 illustrates a selection step forming part of the process

It will be noted that there is a range 20<Q<30 in which the selection of model requires a further stage A 'switching mechanism', as will now be described with reference to FIG. 4, to determine whether 'Model1' or 'Model2' will give more accurate prediction values for 'Average Bits/Frame (R)' for the particular segment under consideration when 'Q' falls within the range between [21,30].

For 'Model1', apply Q3=30, Q4=40, thus deriving modelling parameters a', b'.

For 'Model2', apply Q1=10, Q2=20, Q3=30, Q4=40, producing modelling parameters a, b, c, d.

After producing the two formulae, set 'Q=20' for each one, thus producing different values R20 and R20' for the two models The 'Deviation % (D)' is calculated between these two values:

$$D=[(R20'-R20)/R20']*100\%.$$

The model to be used to predict 'R' for values of Q in the range between 21<Q<30 is selected according to the absolute value of D. If −6%<D<+6%, model 1 is used, but if D falls outside the range +/−6%, model 2 is used.

In parallel with this process, the video sequence is split into video segments of variable length by a Segment creation (Wn)' process 14. The "Segment" creation process 14 defines individual windows or segments within the video sequence. It extracts the encoded data from one of the parallel encoders 13, using a fixed quantiser value, for example Q4=40, and determines the value R (average bits per frame) for every S frames, where "S" is the sample rate. For example, if 'S=1', this check is performed for every frame. More typically, this value is set equal to the target frame rate. For example, if the target frame rate for a video sequence to be encoded is 15 frames/sec, S is set at a value of 15, so, the check will take place every 15 frames. In the example shown in FIG. 3, the entire sequence has a length of 49 frames, and it has been dynamically separated into four individual segments Wn. Of course, in another example, there may be a smaller or larger number of segments Wn, depending on the content, and on the value of the threshold (A), set at the beginning of the encoding process.

Exceptionally, the first segment uses a number of frames equal to twice the value set by 'S'. This means that the 'first check' will take place 2*S=2*15=30, after 30th frame. This is to take account of the presence at the beginning of the clip of an 'Intra' frame, which produces more bits than 'P' frames. Thus, the bits are better spread over the first segment, producing better VBR characteristics.

Figure 2:
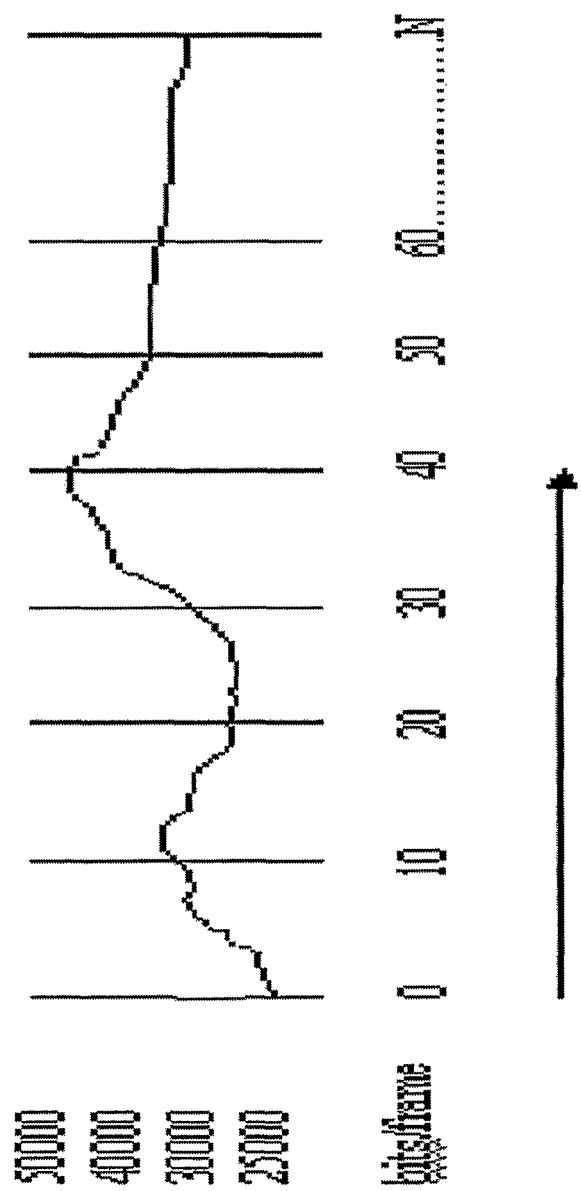
FIG. 2 illustrates the variation in bits per frame over an illustrative sequence of frames.

The value R (Average bits/frame) is calculated throughout the entire video sequence during the first pass, and the results stored (15). This value R indicates the average number of bits per frame at a specific instant. For example, to calculate 'R' for the fifth frame, assuming for the sake of illustration that the first five frames produced 2000 bits, 1000 bits, 500 bits, 1000 bits and 500 bits respectively, R(5)=(2000+1000+500+1000+500)/5=1000 bits/frame. FIG. 2 shows a typical trace of 'Average Bits/frame(R)' in the 'y axis', versus 'Frame No (N)' in the 'x-axis'.

If the value R exceeds the previous value of R by a threshold value A, (for example 30% larger), the current frame is set as the last frame of the current segment (Wn), and a new segment is created.

The threshold value is set at the beginning of the process by the end-user. The bigger this value, the closer the result will be to 'VBR' characteristics. If the value is close to '0', the sequence will be encoded with characteristics close to 'CBR'. A typical value for this parameter would be 30%.

Thus, during the first pass, four streams have been created with different values of fixed Quantizer Q as shown in FIG. 3, and depending on the average bits/frame variation, segments Wn of variable length have been created. The average Bits/frame rate (R) are then predicted for each segment for different values of Quantizer 'Q', ranging from [1,50].

Since the segments have been defined such that the value R varies only within a limited range in each such segment, it is then possible to use the value of R in each segment to determine, using the R-Q function (16), the appropriate quantization factor Q to be used in the second, encoding, pass for each individual segment throughout the entire sequence (process 17). The appropriate value of R, and thus of Q, can be based on constraints such as decoder buffer capacity, transmission rate, or total storage size. These constraints may be pre-set, or obtained as data from the decoder 2.

In order to select the optimum quantisation value Q for each segment, as determined by the optimisation process, a value R is selected that satisfies a condition:

$$R<Tg/f$$

Where:
R is the average bits per frame to be determined from the R-Q function 16
f: is a Target Frame-Rate: the rate at which the frames are to be delivered to the destination
Tg is a Target Bit-Rate, representing the bit rate required to maintain the target frame rate
These values Tg and f are determined by the capabilities of the transmission medium 3 and the user equipment 2, and by the nature of the video stream content
For example, if Tg=20000 and f=10, then R<2000 kbits/frame.

An optimum quantisation value Qbest can be determined using the R-Q function. This process is applied to each segment generated by the segmenter 14. If there is a large change in the value of 'Q' between one segment and the next, the end-user will notice an abrupt change in video quality, which can be disturbing. To mitigate this effect, this embodiment applies a smoothing process 18 to the quantisation values generated by the optimiser 17. This process is illustrated in FIGS. 4, 5, 6, and 7.

Figure 5:
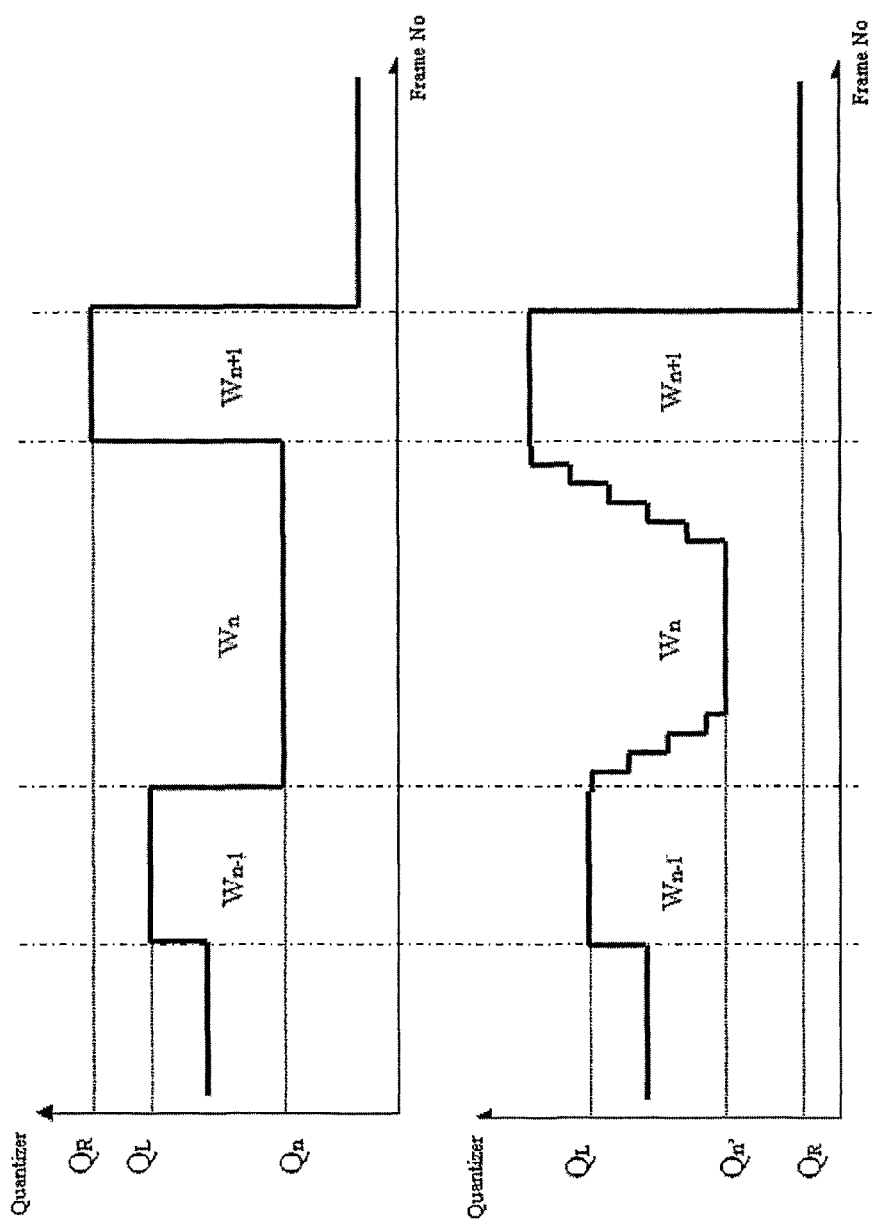
FIG. 5 illustrates the quantisation values generated by the process, for an illustrative sequence of frames
Figure 6:
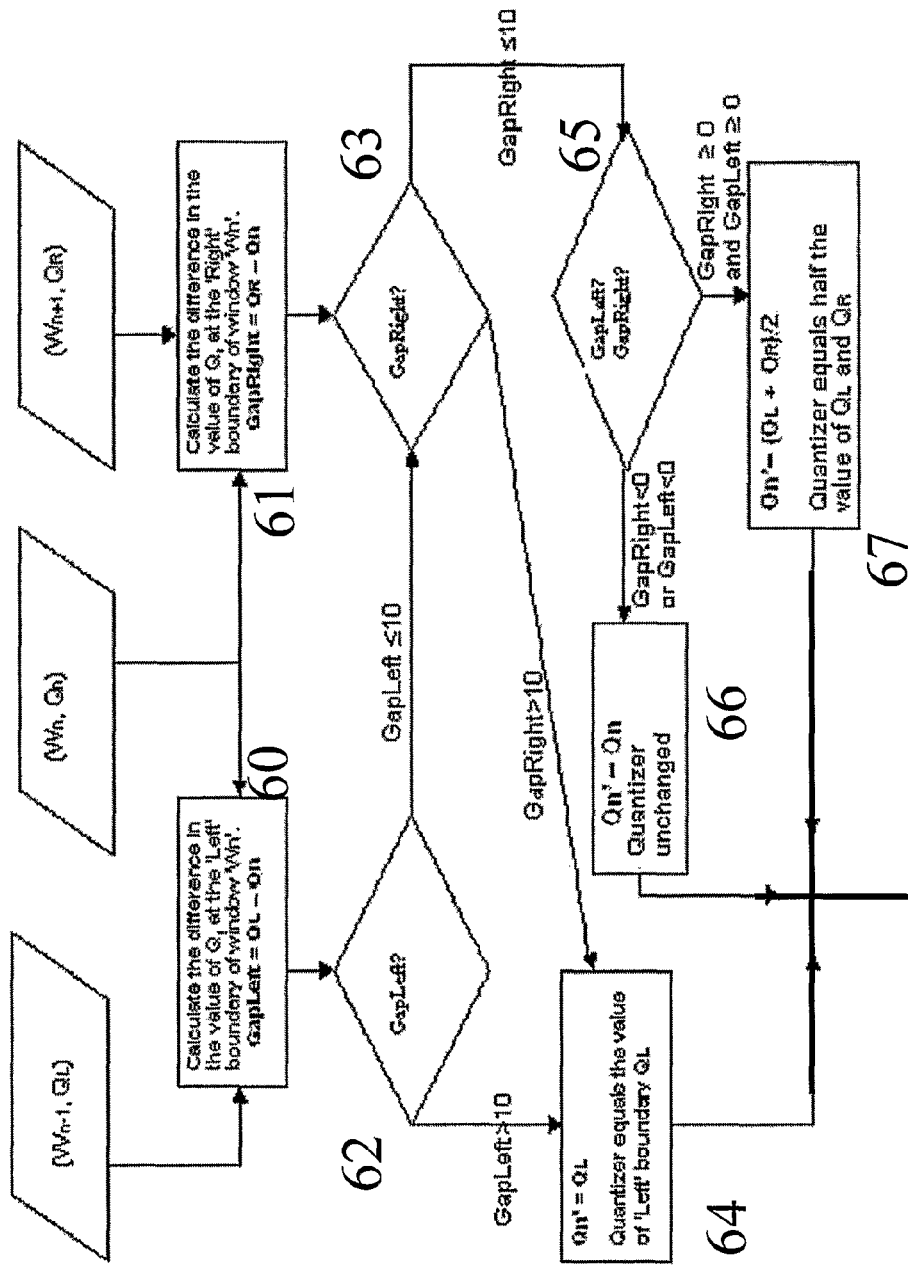
FIG. 6 illustrates a first part of a smoothing process that may be performed on the quantisation values.
Figure 7:
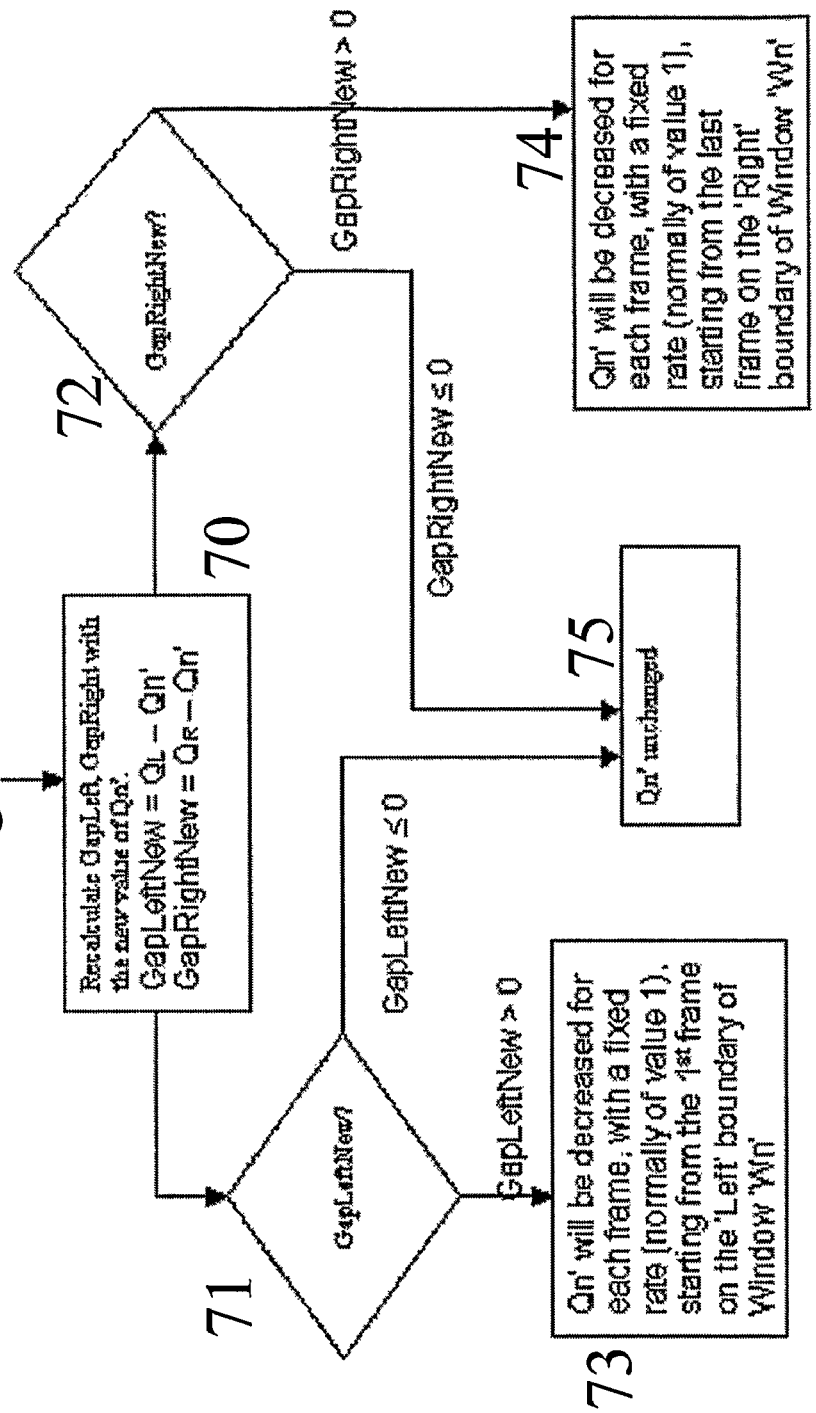
FIG. 7 illustrates the rest of the smoothing process

The upper trace of FIG. 5 illustrates an example in which each segment W has its own value of Quantisation level Q, after applying the 'MRC' functions in optimiser 17 but before smoothing. It will be noted that there is an abrupt difference in the Quantisation value Q at the transitions between segment 'Wn' and the adjacent segments 'Wn−1' and 'Wn+1', which have quantisation levels QL and QR. Again, note that low values of "Q" correspond to a high number of bits per frame FIG. 6 and FIG. 7 illustrate the smoothing process. This process first sets a revised quantisation parameter Qn' for the segment under consideration. This revised quantisation parameter is the same as that of the immediately preceding segment if either that segment or the immediately following segment have quantisation parameters that are greater than that of the current window by more than a predetermined threshold (steps 62-64). Such large changes would be distracting to a human observer even if the transition were to be smoothed, so in such cases the quantisation level is held at its previous value.

If the changes are small enough to be accommodated by the smoothing process, the quantisation value Q is changed stepwise at the transition from one segment to the next (steps 73,74). This is always done by increasing the value of Q (reducing the bits/frame) for individual frames from the segment having the lower value of Q, as this is less likely to overload the buffer at the destination. However, if the segment under consideration has a lower quantisation value than both the immediately preceding segment and the one immediately following, the value of Q to be used is first set to be intermediate between those values (step 67), rather than the (lower) optimum value for that segment.

The smoothing process will now be described in more detail. First, the differences in the values of quantizer Q, at the left and right boundaries of segment Wn, are calculated.
GapLeft=QL−Qn (step 60)
GapRight=QR−Qn (step 61)
(Note that Qn and QR are the values generated by the optimiser 17, but QL is the value resulting from the smoothing process when applied to the previous segment. In its turn, QR will be revised, using for the preceding segment the value of Qn' that is about to be generated).

These gap values are next assessed to determine whether they exceed a threshold value (step 62, 63). In this example, the threshold value is set at +10.

If either GapLeft or GapRight exceeds this threshold we set a value Qn'=QL, where Qn' is the new value of Q (step 64). If both GapLeft and GapRight fall at or below the threshold value, a further test is made to determine the signs of the gaps (step 65). If either is negative, we set Qn'=Qn (step 66), in other words the value derived by the optimiser 17 is used. If both gap values are positive or zero, we set Qn'=(QL +QR)/2 (step 67), thereby setting a value intermediate between the values immediately preceding and following the segment under consideration. This results in a lower quality (larger quantisation value) for that one segment than was set by the optimiser 17, but it minimises the transitions in quality between the segments.

Referring now to FIG. 7, the value Qn' is used to generate two new values (step 70)
GapLeftNew=QL−Qn'
GapRightNew=QR−Qn'

These values are used to apply the smoothing process itself, to the first few and last few frames of the Segment Wn, as shown for step 73.

If GapLeftNew has a positive value, the quantisation value of the neighbouring frame QL is applied to the first frame of the segment Wn, and for each subsequent frame the quantisation value is decremented by a 'step-value' until a minimum value Qn' is reached. Subsequent frames then all have this minimum value Qn'. For example, if QL=40, Qn'=32, and Step-value=1, we obtain GapLeftNew=40−32=+8. This value is positive, so for each frame of the segment, starting with the first, the quantizer 'Q' is decremented by '1' from the value for the preceding frame until the level Qn' is attained. So for example, Qn1=40, Qn2=39, Qn3=38, . . . Qn9=32, where Qn1 is the quantizer for the first frame in the 'Segment Wn', Qn2 refers to the frame after the first frame and so on. All frames subsequent to the ninth have the value Qn=Q9=32.

Similarly, if GapRightNew is positive the same methodology is used for the last few frames of the segment (step 72, 74), as follows. If GapRightNew is positive the value of 'Q' for the last frame of the segment is increased to QR, and each preceding frame is decremented from that of the following frame by the step value, until the minimum value Qn' is reached. For example if QR=38, Qn'=32, and Step-value=1, we obtain GapRightNew=38−32=+6. This value being positive, the last six frames of the segment (Qnlast-5 to Qnlast) are given quantisation values increasing stepwise from Qn'=32 to QR=38, thus: Qnlast-6=32, Qnlast-5=33, . . . Qnlast-2=36, Qnlast-1=37, Qnlast=38.

It will be seen that the value of GapLeftNew for any given segment is opposite in sign to GapRightNew for the previous segment. If GapLeftNew is negative there is no 'stepped' change of Quantizer (Qn') at the beginning of the segment under consideration (step 75). Instead, the previous segment, having a positive GapRightNew, will instead be subjected to the smoothing process. Similarly if GapRightNew is negative there is no 'stepped' change of Quantizer (Qn') at the end of the segment under consideration (step 75), but the subsequent segment is subjected to the smoothing process by virtue of its positive value for GapLeftNew.

If the gap value for either transition is zero, there is of course no need for any smoothing at that transition. However, it should be noted that such an eventuality is unlikely, as the segments are defined according to changes in the appropriate quantisation level.

The lower part of FIG. 5 shows the results of the smoothing process when applied to the trace of the upper part of that Figure. Allowing the smoothing process to operate such as to increase the value of Q in frames of the segment with the lower value, as shown in the lower trace of FIG. 5, rather than increasing it in the segment with the higher value, ensures that Qn' is always greater than Qn in any given segment, and thus the bit rate never exceeds the capacity of the transmission medium 3.

This is the end of the 'First-Pass', steps 10-18. The encoder 19 may now encode the entire video sequence as in a conventional VBR encoder (encoder 19), on a second pass of the data. It uses the estimated quantization factors Q for each segment, as determined by the optimisation and smoothing procedures 17, 18, and transmits the resulting bit stream to the decoder 2 over the network 3.

As the optimum Quantisation value for any bit-rate can be predicted from the first pass, it is possible to encode multiple streams at the same time with 'VBR' characteristics (Multi-stream) as the appropriate bit-rate for each one can be easily predicted from the process. The first pass may be performed at any time, in anticipation of a request for the relevant sequence at a given bit rate, or it may be done on specific demand.

VBR-type inputs present a problem at the receiver 2 in ensuring that sufficient buffering resources are available. There are two inter-related criteria to determine, namely the buffering capacity and the buffering delay. As the number of bits per frame varies, and the bit rate itself is constant, the frame rate will vary. The buffering delay required is that sufficient to allow the slowest frames (highest number of bits per frame) to be delivered and processed in time for them to be displayed, whilst the buffering capacity is determined by the capacity needed to store frames that have been decoded before they are required. As these capacities depend on variations in the number of bits per frame, it cannot be predicted by the decoder without some data relating to the sequence to be decoded.

A mathematical model will be expressed to describe the buffer level at the decoder side for 'Video Streaming' applications.

Figure 8:
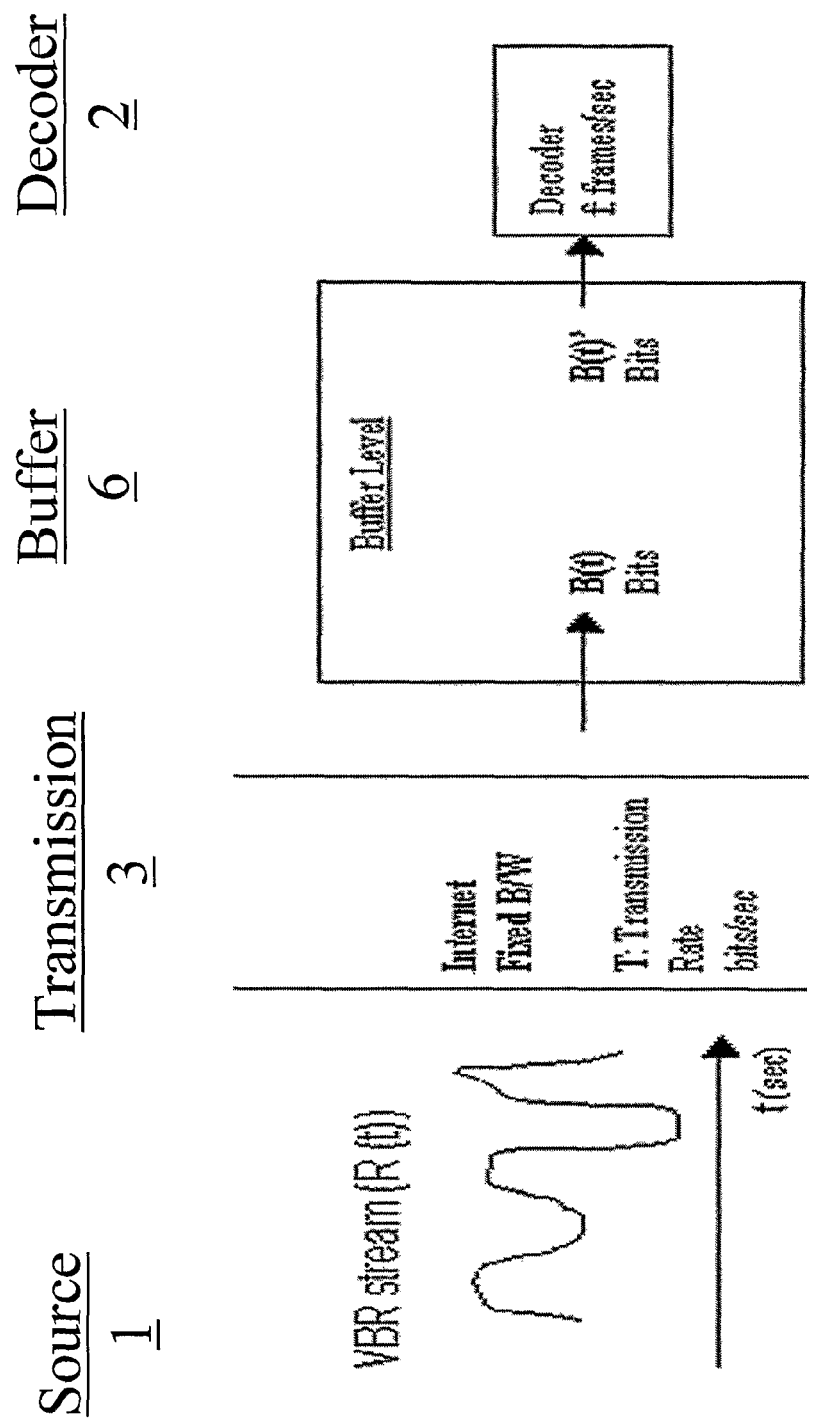
FIG. 8 illustrates the buffering process

FIG. 8 illustrates the level of the buffer 6 at the decoder 2, showing how the buffered data is built up over time when a bitstream 90 is transmitted over a fixed bandwidth network 3. The following parameters will be defined.

T: Transmission Rate (bits/sec)—this is the bandwidth of the transmission channel 3.

f: Target frame rate (frames/sec)—this is the rate at which the frames represented by the bitstream are to be displayed by the display device 5.

R(t): Average bits/frame for bitstream over time t. This is a cumulative property, varying over time.

t: elapsed time (seconds)

B(t): Bits inserted in the buffer—this parameter shows the number of bits inserted into the buffer over the period of time t.

B(t)': Bits extracted from the buffer—this parameter shows the number of bits extracted from the buffer over the same period of time t.

The number of bits 'dB' contained in the buffer at a given time t is given by:

$$dB(t)=B(t)-B(t)'$$

Also, the number of bits B(t) that were inserted into the buffer in the time "t" is given by:

$$B(t)=T*t$$

Similarly, the number of bits B(t)' that have been extracted from the buffer in the same time is given by:

$$B(t)'=R(t)*f*t$$

Consequently, the net number of bits 'dB' remaining in the buffer at a given time t is given by:

$$dB(t) = B(t) - B(t)'$$
$$= (T - R(t)*f)t$$

This function identifies the number of bits contained in the buffer at a given time t, assuming that the transmission rate is ideal and fixed at a rate T. Since T and f are predetermined, the value of dB(t) varies over time as a function of R(t).

Buffer underflow, or "starvation", is the condition that occurs if the next frame is due to be decoded before the necessary data has arrived—in other words the buffer is empty. In order to avoid buffer underflow, it is usual to delay the start of the decoding process after the arrival of the first data in the buffer store. This introduces a delay in display of the video sequence to the end user, and it is desirable to minimise this delay.

From the function above, it is possible to determine a minimum value dBmin(tmin), and also the time tmin at which that minimum value will occur. If this minimum value is negative, that is to say if there is a time tmin at which the number of bits received up to that point by the decoder 2 is less than the number required to have been decoded to maintain the frame rate to the display device 5, an underflow condition exists.

In this embodiment, to avoid buffer underflow, a buffer delay is to be introduced at the beginning of the decoding process for a period of time given by:

$$tb=dBmin(tmin)/T.$$

Thus the number of bits received before the decoding process starts is T*tb, thereby priming the buffer by that number of bits. Thus dBmin is raised to zero, and the buffer delay is minimised.

In a VBR system the amount of buffering required varies, as at times of low bit/frame rates the number of bits arriving is greater than the rate at which they are being processed by the decoder. Buffer 'Overflow' may occur if there is not enough memory allocated for storing the video packets before they are decoded. If the peak buffer size required can be determined before the transmission of the video sequence, sufficient buffer capacity can be reserved in the decoder in advance.

As already discussed, the number of bits 'dB' contained in the buffer at a given time t is given by $$dB(t)=(T-R(t)*f)t$$

Using this function, if the values of R(t) are known, it is possible to identify a time 'tmax' when this property dB(t) reaches its peak value, dBmax. From this, the buffer size 'Bf' allocated to prevent buffer-overflow can be determined:

$$Bf=dBmax(tmax)+dBmin(tmin)$$

where dBmin represents the absolute minimum value of bits with which the buffer is primed to prevent underflow, as already discussed.

In a true VBR transmission the values of tb and Bf cannot be predicted in advance, since they depend on the cumulative variable R(t) which itself depends on the encoding process.

It would be possible for the encoder to generate header information to control the buffer parameters, but this requires an additional overhead.

FIG. 1 illustrates a method in accordance with the present invention, which avoids the need for any extra header information. It provides a process 31, 32, according to the invention, by which the buffer 6 in a decoder 2 may be operated with a VBR input in such a way as to avoid any 'underflow' condition in the decoder buffer.

FIG. 1 also illustrates a process 41, 42, by which the buffer 6 in a decoder 2 may be operated in such a way as to avoid any 'overflow' condition in the decoder buffer.

The input may be generated using the process of steps 10-19 described above, but may also be used with other inputs.

In this embodiment the bitstream is transmitted over a transmission channel having a fixed guaranteed bandwidth (T). Recalling that the net number of bits 'dB' remaining in the buffer at a given time t is given by:

$$dB(t)=(T-R(t)*f)t$$

where f is the frame rate and R(t) is the cumulative average number of bits per frame. In order to avoid buffer underflow we require that $dB(t) \geq 0$ for all times "t" throughout the entire sequence, and it follows that $R(t) \leq T/f$ In order to maintain the cumulative number of bits per frame R(t) below this maximum value the data representing some frames may have to be omitted from transmission.

In order to achieve this, the encoder 19 is controlled 31, 32 to selectively omit the data representing certain frames from the transmission, thus avoiding buffer underflow. This can be performed in three different ways:

Firstly, it could be an 'off-line' process, which could take place after the end of the 'VBR' encoding process described above. Alternatively, it can take place dynamically, during the second pass of the process described above. In a third possibility, the process could take place before the transmission of the clip, and after the complete sequence has been encoded, by checking how many frames are transmitted every second, and dropping frames according to rules to be described later.

Figure 9:
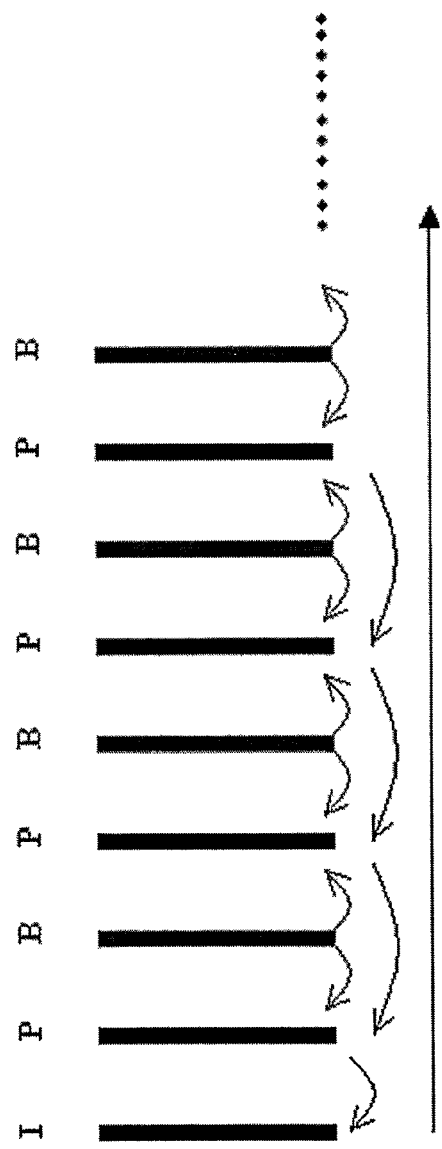
FIG. 9 illustrates the structure of a typical video sequence, illustrating the various frame types

FIG. 9 illustrates a standard encoding video sequence with I-Frames, P-Frames, and B-Frames. H264, MPEG-4, MPEG-2 and all related video compression standards use this schema. The I-frame establishes the initial conditions of the sequence, and subsequent frames are generated by determining the differences between each frame and its neighbours. Each P-frame is coded for differences from the preceding P (or I) frame, and each B frame is coded for differences from both the preceding and following P frame. It will be seen that neighbouring frames are not dependent on the B frames, so if some of them are dropped the remaining frames could still be decoded without losing video decoding quality and consistency. However, dropping individual P-frames would affect the decoding of their neighbouring frames. It follows that only B-frames should be dropped. (It should be noted that in the determination of the value of the cumulative number of bits per frame R(t), the dropped B-frames are counted as frames of zero size—thus dropping a frame results in a reduction in the overall number of bits per frame. Similarly, the value of the received frame rate f takes the dropped frames into account)

The determination of the number of B-frames to be dropped is determined as follows. Over any period t, the number of bits transmitted must not exceed the target transmission rate T. To achieve this, the number of bits produced from the frames are summed over the period t (process 31), and then B-frames are dropped, thus subtracting their bits, until the target rate is achieved (step 32).

$$\Sigma B(i) \leq T^* t$$

Where T: Target Transmission rate,
$\Sigma B(i)$: Sum of bits produced by the number of frames in period t.

B-Frames could be dropped randomly, or selectively according to a criterion such as "largest first" (so that fewer frames need to be dropped) until the condition is met. This is demonstrated in FIG. 10. One B-frame is dropped between each pair of P-frames until the number of bits is reduced to the target number. If the end of this segment is reached before the target has been met, the process starts over again, omitting a second B-frame from between each P-frame until the condition is met. Of course, the ratio of B frames to P frames n(B)/n(P), which in this example is 2, must be sufficient to allow this to be done.

For example, taking

| | |
|---|---|
| target frame rate | f = 10 frames per sec, |
| Transmission rate | T = 20000 bits/sec, and |
| Time window | t = 2 sec, |
| Cumulative bit rate/frame | R(t) = 2325 |
| Frame sizes: | P1 = 3500 bits, |
| | B2 = 1500 bits, |
| | B3 = 1800 bits, |
| | P4 = 4000 bits, |
| | B5 = 2200 bits, |
| | B6 = 1000 bits, |
| | P7 = 3000 bits, |
| | B8 = 1300 bits, |
| | B9 = 1300 bits, |
| | P10 = 2800 bits. |

The total Number of bits coded in this time frame segment=2240 bits/frame. Note that this value is not the same as R(t) because R(t) is a cumulative value over the entire sequence up to this point.

Applying the values to the inequality expression $f \leq T/R(t)$ derived above, this window of ten frames generates a frame rate f'=20000/2325=8.6 fps.

To achieve the target frame rate f=10 fps, at least two B-frames need to be dropped in this window to minimize start-up delay whilst and avoiding buffer underflow. The exact number of frames to be dropped is determined by the summation $\Sigma B(i) \leq T^* t$. Summing the frame sizes:
3500+1500+1800+4000+2200+1000+3000+1300+1300+2800=22400=T+2400

In other words at least 2400 bits must be removed by dropping 'B-frames'. Starting at the beginning of the segment, we drop the first B-frame following each of the first two P-frames (i.e. B2, B5). This results in the loss of 1500+1800=3300 bits, which is sufficient to meet the target frame rate f.

Figure 10:
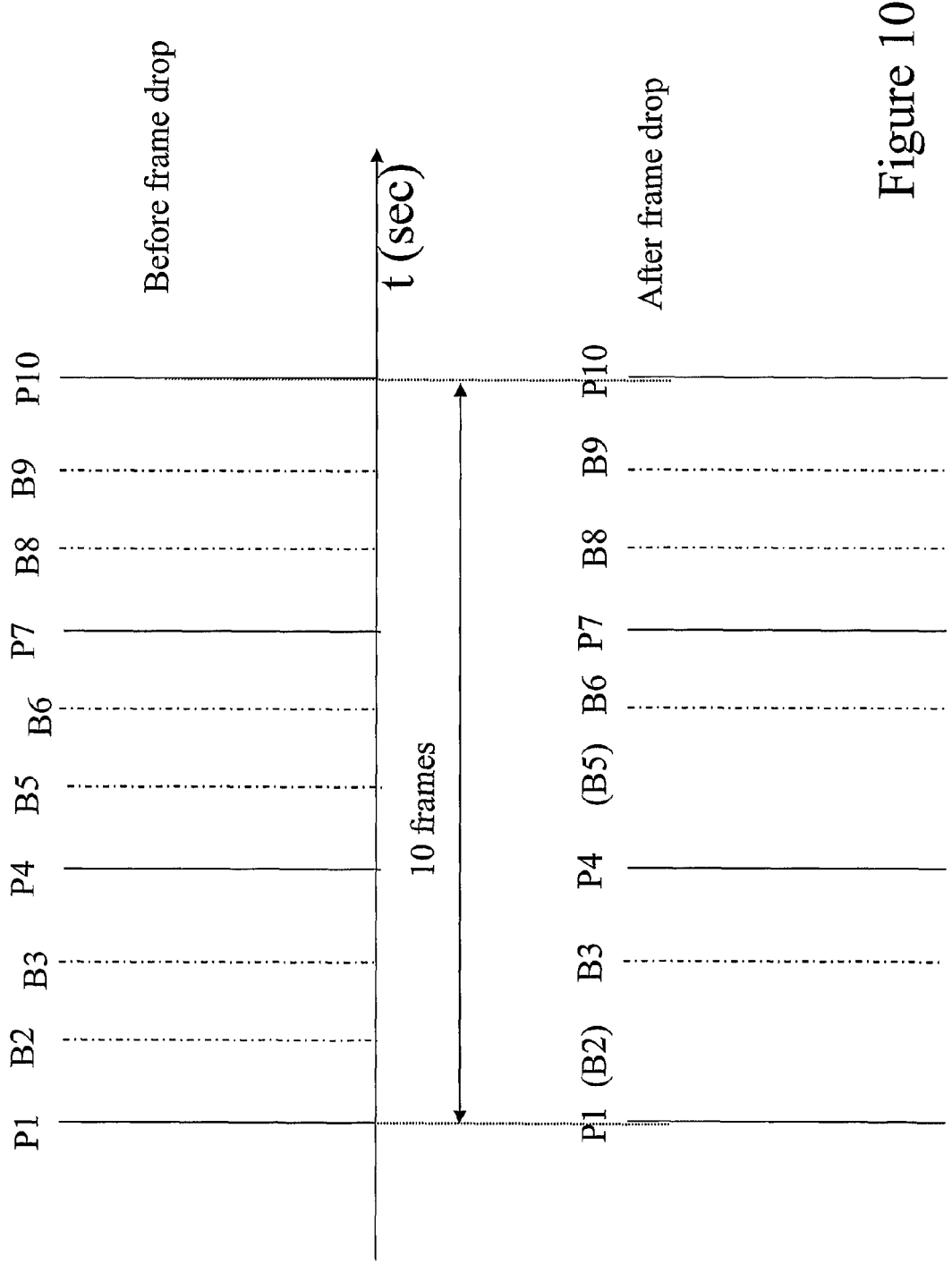
FIG. 10 illustrates a process for selectively omitting frames from a sequence

FIG. 10 demonstrates how B-frames are dropped according to this pattern. In this example two frames are dropped, thus saving 2400 bits and allowing minimal start-up delay and no buffer underflow. This process is repeated throughout the entire sequence. This invention allows buffer underflow to be avoided by modification to the transmitted signal before the actual transmission of the clip.

A residual start up delay $t_b$ may be allowed in order to drop fewer frames. This provides a number of extra bits $E = t_b \times T$ These extra bits can be used throughout the sequence to save some of the B-Frames. For example, if buffering is set not to exceed 2 seconds, thus $t_b$=2 sec. If T=20000 bits/sec, E=2 sec*20000 bits/sec=40000 bits extra. In the previous example, 2400 bits to prevent the B-frames from being dropped. So, if the extra bits are subtracted from the bits needed for that instance (t) in the example described earlier, we have: 40000−2400=37600 bits>0.

In other words, for that instance we 'saved' two 'B-Frames' (not dropped) and we kept 37600 extra bits to be used in next instances, repeating the process until the end of clip is reached. It will be apparent that the larger the 'buffering', the fewer 'B-Frames' will be dropped, but the larger the start-up delay will be.

This process requires certain frames of the sequence to be dropped from transmission. Certain criteria need to be met to ensure that the consequent impairment of the quality is minimised. Referring again to FIG. 1, it will be recalled that the segmenting process 14 is arranged such that the variation in quantisation level within any given segment is limited to a threshold parameter A. In the process to be described, this parameter will limit the frame rate drop, when the stream is delivered to the end user.

The existence of this threshold ensures that the frame rate will not drop below a value fmin given by:

$$f_{min} = f(1-A)$$

where f is the target frame rate, and A is the threshold previously defined. For example, if the threshold A=30%, and the target frame rate f=25 fps, $$f_{min} = 25 \times (1-0.3) = 17.5 \text{ fps.}$$

In this example the frame rate cannot fall below 17.5 fps throughout the entire sequence.

In order that the frames to be dropped can be selected from the B-frames alone, the ratio of 'B-frames' to 'P-frames'

$$n(B)/n(P) \geq kA$$

where, n(B)=number of 'B'-Frames n(P)=number of 'P'-Frames k is a constant selected to compensate for the relatively large size P frames, typically in the range 1.5 to 2 times larger than B frames. In the example below, we select k=2. For example, given threshold A=30%, the ratio of 'B-Frames' to 'P-Frames' should be given by: n(B)/n(P) $\geq$k×0.3=0.6

In other words, the process requires that for this threshold value the B/P ratio should be no smaller than 0.6. This ratio can be very easily set in most implementations of the H264 standard. Of course, when the actual rate exceeds the target frame rate, there is no need for any frames to be dropped to avoid buffer starvation.

It should be noted that although individual B-frames are dropped, the receiver can detect the absence of these frames by comparing time stamps in the video stream and a corresponding audio stream, or by means of a coded "place marker" transmitted in place of the missing frame, or because of the absence of a B-frame from the normal pattern of B-frames and P-frames that are received. The receiver compensates for the missing frame by repeating a frame, interpolating between frames, or extending the duration of an existing frame A buffer overflow avoidance process, in accordance with the invention of our co-pending International application entitled Buffer Overflow Prevention and claiming priority from United Kingdom application GB0428156.4 takes place at the receiver, during the streaming of the sequence. As for the underflow avoidance system previously described, this relies on the presence of B-frames, and the encoding of the stream with a threshold A limiting the variability of the number of bits per frame.

The maximum memory allocated to the end-device will be defined as M. If this value is exceeded, 'buffer overflow' will occur. It has already been known that the state of the 'buffer' throughout the streaming of the sequence is represented by $$dB(t)=(T-R(t)*f)t.$$

By having applied the process described earlier, we can be sure that for any t, dB(t)$\geq$0.

In order to avoid 'buffer overflow', dB(t)$\leq$M for any instance t. A threshold for the maximum transmission frame rate fmax is defined to be: fmax$\leq$f(1+A)

where f: target frame rate,

A: threshold variation fmax: maximum actual transmission frame rate

For example, for a target frame rate f=25 fps, threshold variation set at A=30%, $$fmax \leq 25*(1+0.3)=32.5 \text{ frames per sec.}$$

This is the maximum transmission frame rate, which is responsible for building-up the buffer content.

This property fmax ensures that, of the frames transmitted over the period t, a proportion no larger than A (=30%) will be dropped, so the resulting frame rate will not drop below 30% of the target frame rate.

Buffer overflow can be avoided by using these two properties M and Fmax. The bit rate is first determined (step 41). If the condition dB(t)$\leq$M is satisfied, there is no need to take any measures, as buffer overflow will not occur. But, in the case where this condition is not met frames are dropped from the segment which has been most recently delivered from the network (step 42). The number of 'B-frames' to be dropped is determined in the same way as already discussed in relation to the encoder:

$$\Sigma B(i) \leq T*t$$

Where T: Target Transmission rate, $\Sigma B(i)$: Sum of bits produced by the number of frames contained on that instance t.

Figure 11:
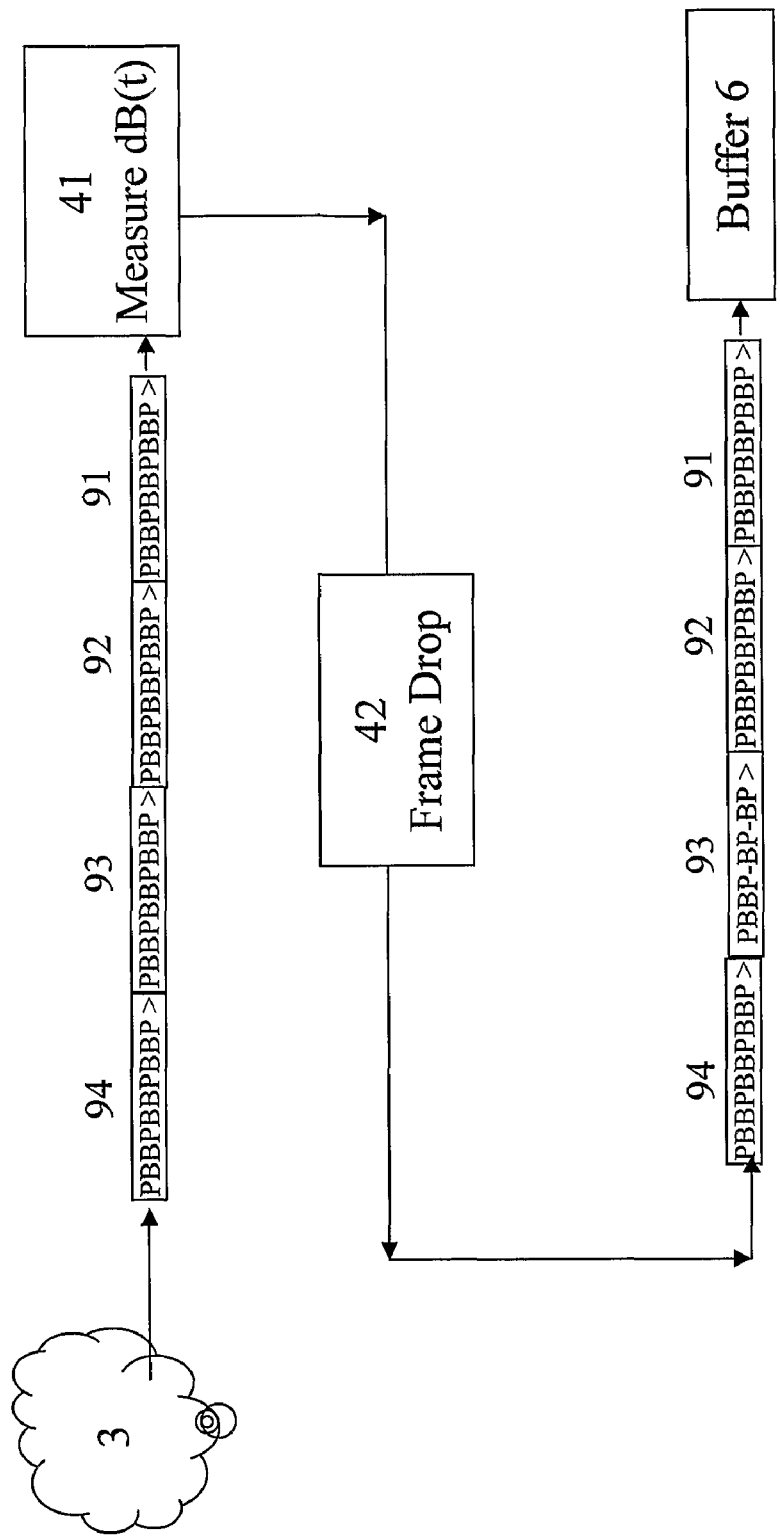
FIG. 11 illustrates a frame omission process taking place at the decoder of FIG. 1.

The B-frames can be dropped using the same rules as described above for underflow prevention, as illustrated in FIGS. 9 and 10. FIG. 11 demonstrates the process 42 taking place at the decoder of FIG. 1, and illustrates a sequence of four frames 91, 92, 93, 94 before and after the omission of selected B-frames of one of the frames (93) to avoid 'buffer overflow'. This process is repeated throughout the entire sequence.

The receiver 2 applies a synchronisation 7 to the decoded video frame timestamps with those in the audio stream. This causes a frame to be maintained on display for longer, or repeating the display of a frame until the audio timestamps resynchronise with it.

The modes illustrated in FIGS. 1, 9, 10 and 11 do not require extra information to be transmitted prior to the 'Video Streaming session', and there is no degradation of the quality of individual images, but some of the perceived quality perception may be lost when the video is displayed, because of the omission of certain frames. Nevertheless, the perceived quality will be significantly better than that achieved by 'CBR' encoding. This mode also avoids the need for buffering at the beginning of the clip, thus minimising the 'Start-Up' delay without incurring buffer underflow. Moreover, buffer overflow can be easily controlled, so that devices with limited memory capabilities will be enabled to display the VBR encoded video sequence as efficiently as possible.

The invention may be used to control a single stream, or it may be used for multi-channel rate control. In other words, one stream could be delivered to devices connected to different 'pipes' of different transmission rate (T) or 'Bandwidth'. For example if a 'VBR' clip was encoded, applying the rules defined above and with a target transmission rate of T=500 kbps, the sequence could be streamed to several devices connected to the network, with a wide range of bandwidth. All such devices would receive the same video quality, but lower bandwidth devices would experience a reduced frame rate. Each device would set its 'Target Transmission rate' according to its connection, and the rules and functions described above apply for that 'Target transmission rate'.

The invention claimed is:

1. A process of transmitting a video stream that has been previously divided into segments and digitally encoded such that the frame rate at which individual segments of data are encoded varies according to the amount of data required to generate each segment, wherein:

data representing selected frames are omitted from transmission such that the cumulative frame rate at which frames are transmitted does not fall below a predetermined value, and the frames in respect of which data is to be omitted are selected according to the amount of data needed to encode them.

2. The process according to claim 1, wherein a threshold limit is set for the amount by which the number of bits per frame may vary within a given sequence, so as to limit the number of frames that may be deleted.

3. The process according to claim 1, wherein the video stream is transmitted at a constant bit rate.

4. An apparatus for transmitting a video stream, comprising:
- means for dividing the video stream into segments;
- means for determining the amount of data needed to encode each frame; and
- means for digitally encoding the data such that the frame rate at which individual segments of data are encoded varies according to the amount of data required to generate each segment; wherein
- data representing selected frames are omitted from transmission such that the cumulative frame rate at which frames are transmitted does not fall below a predetermined value, and
- the frames in respect of which data is to be omitted are selected according to the amount of data needed to encode them.

5. The apparatus according to claim 4, further comprising means for setting a threshold limit for the amount by which the number of bits per frame may vary within a given sequence, in order to limit the number of frames that may be deleted.

6. The apparatus according to claim 4, further comprising a setter configured to set a threshold limit for the amount by which the number of bits per frame may vary within a given sequence, in order to limit the number of frames that may be deleted.

7. An apparatus for transmitting a video stream, comprising:
- at least one processor;
- a divider configured to divide the video stream into segments;
- a determining unit configured to determine the amount of data needed to encode each frame;
- an encoder configured to digitally encode the data; and
- a varying module configured to vary the frame rate at which individual segments of data are encoded in accordance with the amount of data required to generate each segment, with data representing selected frames being omitted from transmission such that the cumulative frame rate at which frames are transmitted does not fall below a predetermined value, the frames in respect of which data is to be omitted being selected according to the amount of data needed to encode them,
- the varying module acting on output of the encoder.

* * * * *